United States Patent
Pherson

(10) Patent No.: US 9,834,374 B2
(45) Date of Patent: *Dec. 5, 2017

(54) AIR CARGO CONTAINER

(71) Applicant: Advanced Composite Structures, LLC, Charleston, SC (US)

(72) Inventor: Thomas R. Pherson, Daniel Island, SC (US)

(73) Assignee: Advanced Composite Structures, LLC, Charleston, SC (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/007,357

(22) Filed: Jan. 27, 2016

(65) Prior Publication Data

US 2016/0137408 A1    May 19, 2016

Related U.S. Application Data

(63) Continuation of application No. 13/337,906, filed on Dec. 27, 2011, now Pat. No. 9,248,958.

(51) Int. Cl.
*F17C 3/02* (2006.01)
*B65D 90/22* (2006.01)
(Continued)

(52) U.S. Cl.
CPC ............ *B65D 90/22* (2013.01); *B32B 1/02* (2013.01); *B32B 5/022* (2013.01); *B32B 5/024* (2013.01); *B32B 5/18* (2013.01); *B32B 5/245* (2013.01); *B32B 27/065* (2013.01); *B32B 27/28* (2013.01); *B32B 27/281* (2013.01); *B32B 27/286* (2013.01); *B32B 27/288* (2013.01); *B32B 27/30* (2013.01); *B32B 27/34* (2013.01); *B32B 27/36* (2013.01); *B32B 27/38* (2013.01); *B32B 27/42* (2013.01); *B65D 88/14* (2013.01); *B65D 90/022* (2013.01); *B32B 2250/40* (2013.01); *B32B 2260/021* (2013.01); *B32B 2260/046* (2013.01); *B32B 2262/0269* (2013.01);

(Continued)

(58) Field of Classification Search
USPC ..... 220/560.01, 560.07, 1.5, 88.1; 428/292.1
See application file for complete search history.

(56) References Cited

U.S. PATENT DOCUMENTS 4,212,406 A    7/1980    Mittelmann
4,557,961 A    12/1985    Gorges
(Continued)

FOREIGN PATENT DOCUMENTS

EP    0520745    12/1992
EP    0753470    1/1997
(Continued)

OTHER PUBLICATIONS

Internet Wikipedia encyclopedia on Carbon (fiber), http://www.en.wikipedia.org/wiki/Carbon_(fiber), date unknown but admitted prior art.

(Continued)

*Primary Examiner* — Jeffrey Allen
(74) *Attorney, Agent, or Firm* — Womble Bond Dickinson (US) LLP

(57) ABSTRACT

Composite panel for air cargo containers including a fire resistant, closed cell foam core, a skin attached to at least one surface of the core formed by fire resistant fibers in a matrix resin, wherein the panel will contain an internal fire with temperatures of up to 1500° F. for a period of at least 4 hours.

19 Claims, 9 Drawing Sheets

(51) Int. Cl.
  *B65D 88/14* (2006.01)
  *B65D 90/02* (2006.01)
  *B32B 5/02* (2006.01)
  *B32B 5/18* (2006.01)
  *B32B 5/24* (2006.01)
  *B32B 27/06* (2006.01)
  *B32B 27/28* (2006.01)
  *B32B 27/30* (2006.01)
  *B32B 27/34* (2006.01)
  *B32B 27/36* (2006.01)
  *B32B 27/38* (2006.01)
  *B32B 27/42* (2006.01)
  *B32B 1/02* (2006.01)

(52) U.S. Cl.
  CPC ..... *B32B 2262/10* (2013.01); *B32B 2262/101* (2013.01); *B32B 2262/105* (2013.01); *B32B 2262/106* (2013.01); *B32B 2266/0214* (2013.01); *B32B 2266/0257* (2013.01); *B32B 2266/0285* (2013.01); *B32B 2266/04* (2013.01); *B32B 2266/053* (2016.11); *B32B 2266/08* (2013.01); *B32B 2307/3065* (2013.01); *B32B 2439/40* (2013.01); *B32B 2605/18* (2013.01)

(56) References Cited

U.S. PATENT DOCUMENTS

| | | | |
|---|---|---|---|
| 4,795,047 A | 1/1989 | Dunwoodie | |
| 4,852,316 A | 8/1989 | Webb | |
| 4,874,648 A | 10/1989 | Hill et al. | |
| 4,895,878 A | 1/1990 | Jourquin et al. | |
| 5,979,684 A | 11/1999 | Ohnishi et al. | |
| 6,161,714 A | 12/2000 | Matsuura et al. | |
| 6,291,049 B1 | 9/2001 | Kunkel et al. | |
| 6,503,856 B1 | 1/2003 | Broadway et al. | |
| 6,511,730 B1 | 1/2003 | Blair et al. | |
| 6,711,872 B2 | 3/2004 | Anderson | |
| 6,749,076 B2 | 6/2004 | Fingerhut et al. | |
| 6,825,137 B2 | 11/2004 | Fu et al. | |
| 6,918,501 B2 | 7/2005 | Wang et al. | |
| 6,992,027 B1 | 1/2006 | Buckingham et al. | |
| 7,001,857 B2 | 2/2006 | Degroote | |
| 7,264,878 B2 | 9/2007 | Miller et al. | |
| D617,522 S | 6/2010 | Teien | |
| 7,785,693 B2 | 8/2010 | Johnson et al. | |
| 7,846,528 B2 | 12/2010 | Johnson et al. | |
| D630,815 S | 1/2011 | Teien | |
| 7,972,698 B2 | 7/2011 | Miller et al. | |
| 8,002,919 B2 | 8/2011 | Johnson et al. | |
| 8,322,955 B2 | 12/2012 | Arnesen et al. | |
| 8,973,769 B2 | 3/2015 | Huber | |
| D740,555 S | 10/2015 | Huber | |
| D740,556 S | 10/2015 | Huber | |
| 2003/0106414 A1 | 6/2003 | Wang | |
| 2004/0011789 A1 | 1/2004 | Wang et al. | |
| 2004/0045847 A1 | 3/2004 | Fairbank | |
| 2004/0092379 A1 | 5/2004 | Lewis | |
| 2005/0074593 A1 | 4/2005 | Day et al. | |
| 2006/0189236 A1 | 8/2006 | Davis et al. | |
| 2008/0070024 A1 | 3/2008 | Curran et al. | |
| 2008/0145592 A1 | 6/2008 | Johnson | |
| 2008/0311336 A1 | 12/2008 | Dolgopolsky et al. | |
| 2009/0004393 A1 | 1/2009 | Rodgers | |
| 2009/0311932 A1 | 12/2009 | Hughes | |
| 2011/0091713 A1 | 4/2011 | Miller et al. | |
| 2011/0136401 A1 | 6/2011 | Hanusa et al. | |
| 2012/0266561 A1 | 10/2012 | Piedmont | |
| 2015/0246749 A1 | 9/2015 | Huber | |

FOREIGN PATENT DOCUMENTS

| | | |
|---|---|---|
| WO | 0174688 | 10/2001 |
| WO | 2005016643 | 2/2005 |
| WO | 2010088811 | 8/2010 |
| WO | 2011118793 | 9/2011 |
| WO | 2015136043 | 9/2015 |
| WO | 2016016176 | 2/2016 |

OTHER PUBLICATIONS

Internet advertisement for Transonite Sandwich Panels, http://www.ebertcomposites.com/transonite.html, date unknown, but admitted prior art.
Internet advertisement for Pitched-based Carbon Fiber/Composite, http://www.nsc.co.jp/nsmat/english/business_domain/bd09.html, date unknown, but admitted prior art.
Internet advertisement for Vince Kelly's Carbon-Fiber Technology, http://www.geocities.com/capecanaveral/1320/, date unknown, but admitted prior art.
International Search Report for PCT/US2012/70222, dated Feb. 26, 2013, 2 pgs.
Written Opinion for PCT/US2012/70222, dated Feb. 26, 2013, 6 pgs.
Extended European Search Report for App. No. 12861331.2, dated Mar. 3, 2016, 8 pgs.

AIR CARGO CONTAINER

FIELD OF THE INVENTION

This application relates to a cargo container for aircraft, and more particularly to an air cargo container that includes composite panels which will resist and contain fires that emanate within the container until the aircraft can land.

BACKGROUND OF THE INVENTION

Cargo is typically transported in containers ("Unit Load Devices"), which are stowed in cargo holds either below the deck of passenger aircraft or below and above the deck in transport aircraft. The size and shape of Unit Load Devices vary depending upon the type of aircraft in use. For example, a very common type of aircraft container is the LD3 Unit Load Device, which has an added chamber at one end to conform to the curved sidewalls of the cargo hold compartments of either Boeing 747 aircraft, McDonnell Douglas DC10 aircraft, or similar aircraft. In each of these aircraft, the fuselage is round or oval in cross-section. In all aircraft, the gross weight of the airplane is a substantial factor, because of the cost of fuel. Even a slight reduction in weight is significant. As a result, many aircraft are utilizing fiber reinforced plastic panels. Further, containers for aircraft cargo are also now being formed of composites, in addition to the standard aluminum.

For many years, air cargo containers were made of aluminum alloy. Such containers are roughly handled and easily damaged when loaded into or unloaded from aircraft, and many problems therefore occur with such aluminum alloy containers. Aluminum containers have various disadvantages, such as conducting heat, condensation, and others. As a result, the use of composite panels has grown substantially.

Further, there has long been a concern in air cargo containers and pallets related to losses that may occur as a result of fire. Although aluminum does not burn, it does melt in the presence of temperatures exceeding 1200° F. and ceases to act as a flame barrier. In order to solve this problem in the past, there have been several approaches. One is to use thermal blankets, which will serve to suppress fire. Another is to utilize "active" flame suppression systems in the holds of cargo aircraft that have a heat sensor that can detect an internal temperature rise associated with fire. A nozzle then punctures the roof of a container and injects fire suppression foam. While both of these solutions have proven to work to a certain extent, they are relatively expensive and there are significant problems remaining

SUMMARY OF THE PRESENT INVENTION

In accordance with the present invention, however, it has been determined that a better solution would be in the construction of the cargo container itself. Both of the above solutions have certain drawbacks. In the case of the thermal blankets, there is introduced a large weight penalty. In the case of the heat sensor and nozzle, this has only been applied to the upper deck containers in the past, and also is an expensive fix.

According to the present invention, it is proposed that the walls (sides, rear, front, roof, and perhaps the door panel) of the air cargo containers be constructed of a composite material that will, itself contain a fire within It is also proposed that the floor could be constructed from a similar material which would likely be thicker to handle the higher dynamic and structural loads. For the floor areas, it is possible that aluminum could also function because of the lower thermal flux coupled with a thicker sheet material. Such containers include a fire resistant foam core with a fire resistant skin on either surface thereof. The foam core is proposed to have a density between 0.75-20 lb/ft$^3$ (preferably between 1.9-7.4 (31 kg/m$^2$-120 kg/m$^2$)). Material used in this core can preferably be carbon or ceramic foam, but less expensive phenolic foam may also perhaps be satisfactory. The core will then have a composite skin on either surface, preferably made from basalt fiber, which has a melting point of over 2400° F. or carbon fiber, which also has a high service temperature, however may be more brittle and as expensive. Glass Fiber, which has a softening point of 1200° F. has also been found to be satisfactory in some applications. Each skin can be formed of a single fiber layer or multiple layers in which the fiber of one layer can be at an angle to the fibers of an adjacent layer. This serves to strengthen the skin. The fibers are imbedded in a matrix resin which can be of any of a number of materials, used in composites, including vinyl esters, epoxies, phenolics, and polyimides. Perhaps the economics of the product and process, coupled with product physical impact requirements, make vinyl ester a preferred choice. This material can be purchased with a brominated backbone which can have fire suppressing additives such as tri-hydrated alumina with or without commonly used additives. For high temperature or long duration fire containment, phenolic resins provide superior properties, but can be more difficult to process.

According to another aspect, an acceptable core structure can be a foam-filled honeycomb. This provides the high compressive and shear strength characteristics of a honeycomb with the insulation properties and bonding surface area of foam. This construction tends to be a slightly higher density than foam alone. A typical construction for this application might be phenolic paper/cloth honeycomb with the cells containing phenolic foam.

According to yet another aspect, the use of a three-dimensional fiber construction, such as that generally illustrated in U.S. Pat. Nos. 6,676,785, 6,645,333, and 8,002,919, is contemplated. Z-axis fibers of preferably basalt, carbon, or glass fiber would be inserted through the laminate structure (composite skin/foam/composite skin) prior to impregnation by the resin into the fibers of the skin. The Z-axis fibers are punched through the structure in a computer controlled pattern in a typical (but variable) density of about 1 fiber/cm$^2$. A "tail" of approximately 0.5-1.0 centimeter remains on either side of the structure. This tail is then folded over during the impregnation process and is cured in place. This forms a very strong link against delamination. Although it is not required to make this process work, the Ebert process uses a flat panel pultrusion machine to inject resin into the structure and simultaneously cure the part. During this process, the resign migrates through both skins and through the three-D fibers that go through the core and attach one skin to the next or to the core (in the case of multi-layers skins). When cured this forms rigid "pillars" that structurally support the structure even in the absence or destruction of the foam core.

When constructed as above, the inner skin acts as the first fire-block. Under 1500° F. internal fire conditions, the resin may burn away from the fiber, but the rigid Z-axis fibers will stay intact. The next layer of protection is the fireproof aspect of fire-resistant foam. With the fiber thermal barrier against the fire side, this will insulate the intact outer skin and much of the foam from the extreme heat within the container. The Z-axis fibers, when used, will help prevent delamination of the inner skin and will help retain the physical structure of the material. The general idea of this container construction with these composite panel side walls is that the structure will serve as an insulation member and minimize air intrusion which would normally accelerate the fire and provide additional heat. It is only meant to structurally contain the fire and minimize its spread until the aircraft can safely land.

The three-D structure with the Z-axis fibers would also provide superior impact resistance and delamination resistance during use. With this structure, even a cracked core would likely provide enough fire resistance and insulation value to allow the flight to get to a safe landing location.

The frame members of the unit can be either metal or composite and it should be on the outside of the unit or perhaps contain the panels in a channel. In this configuration, the panels can protect the frame and the frame can hold the panels in place to maintain structural rigidity during fire. It is also important that they stay intact to minimize air intrusion.

The base of the unit can be of the same material as the walls, although the fireproof foam may not be necessary. The skins will be thicker to support loads and impacts, common to this application. Lower cost fireproof foam such as phenolics are feasible for the base, however the higher cost carbon foams may possibly be preferable in the upper structure.

The door can be made from the same material or from a basalt fiber cloth, which, when coated with an intumescent coating, can also be used to prevent fire migration through the door.

As a result the structure disclosed should provide adequate fire protection in the case of an internally generated fire that is fueled by the contents of the container. Such containers, as described, will contain fires with temperatures of up to 1500° F. for 4 hours, long enough for the planes to make a safe landing. Also importantly, it will be light enough to compete favorably with aluminum containers and to withstand far more damage than such aluminum containers.

DETAILED DESCRIPTION OF A PREFERRED EMBODIMENT

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as density, weight, temperature, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

As used in the description and the appended claims, the phrase "unit load devices (ULDs)" also known as "air cargo containers," is defined as containers used to load luggage, freight, mail, and the like on wide-body aircraft and some specific narrow-body aircraft.

Figure 1:
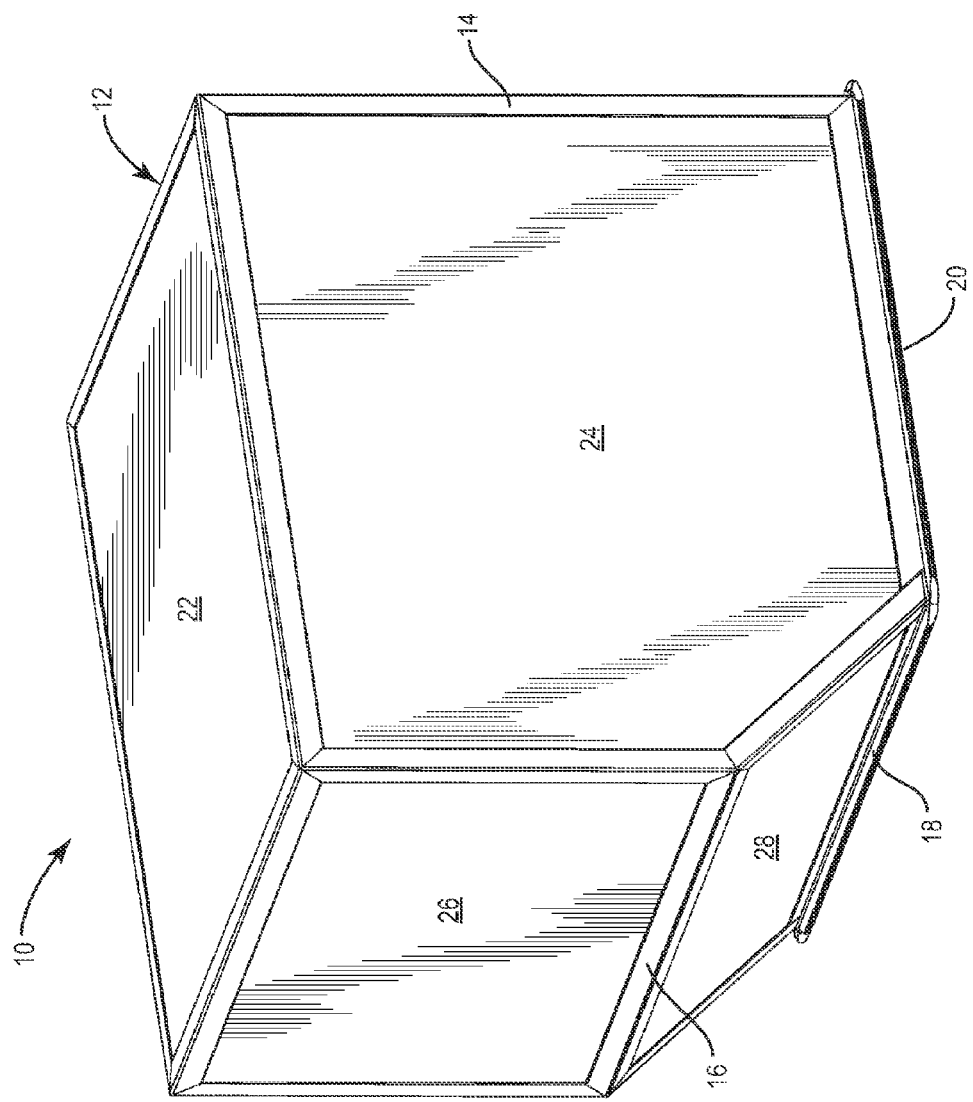
FIG. 1 is a front perspective view of an air cargo container built in accordance with the present invention.
Figure 2:
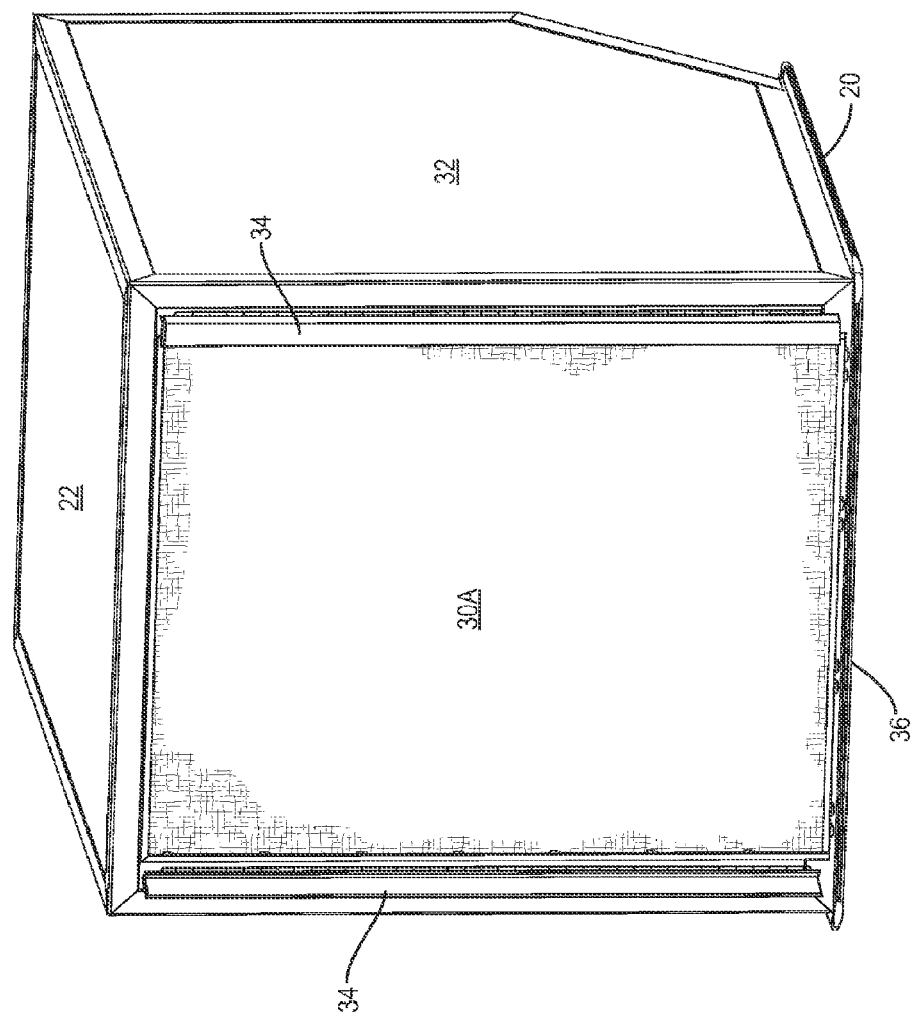
FIG. 2 is an end perspective view of the container illustrated in FIG. 1.

Referring now to FIGS. 1 and 2, there is illustrated generally at 10 an air cargo container or ULD. It will be understood however, that the panel assemblies and panel bodies described herein may be used with any type of ULD or even with other types of air cargo containers. The ULD 10 includes a frame 12 having a plurality of frame members 14, 16, 18. The ULD 10 further includes a cargo opening in one wall. The frame 12 may be formed from any substantially rigid material, such as aluminum, steel, composites, temperature resistant plastics, other metals and non-metals.

The panel assemblies include a base or floor 20, a roof 22, and side walls 24, 26, 28, 30, 32. A door or other closure panel 30A may be placed in either of side walls 24, 30, or 32 to selectively cover the cargo opening.

The door or closure member 30A as illustrated in FIG. 2 may be formed of a fire resistant fabric such as, for example, a woven fabric of basalt, carbon, or fiberglass fibers with an intumescent coating (soft char or harder char). The fabric closure member 30a is attached in some suitable manner along the top edge to the adjacent edge of the roof 22. For example, closure member 30A may be provided with a hem along the top edge through which metal strips extend. Holes are drilled through the metal strip at spaced points and corresponding openings provided in the fabric in both folds of the hem. Rivets then attach the closure member to the roof 22.

As the sides are lowered for closure, it is important that any air intrusion between the sides of the closure member and the adjacent frame members 14 be limited. For this purpose an elongated hinged clamp member 34 attached to adjacent frame member 14 may be used to selectively cover and hold the side edge of the closure member in such a manner as to limit or prevent air intrusion. The sides may also be retained in the closed position adjacent to the frame 14 by other means, such as zippers or hooks, so long as the closure system limits air intrusion.

Figure 6:
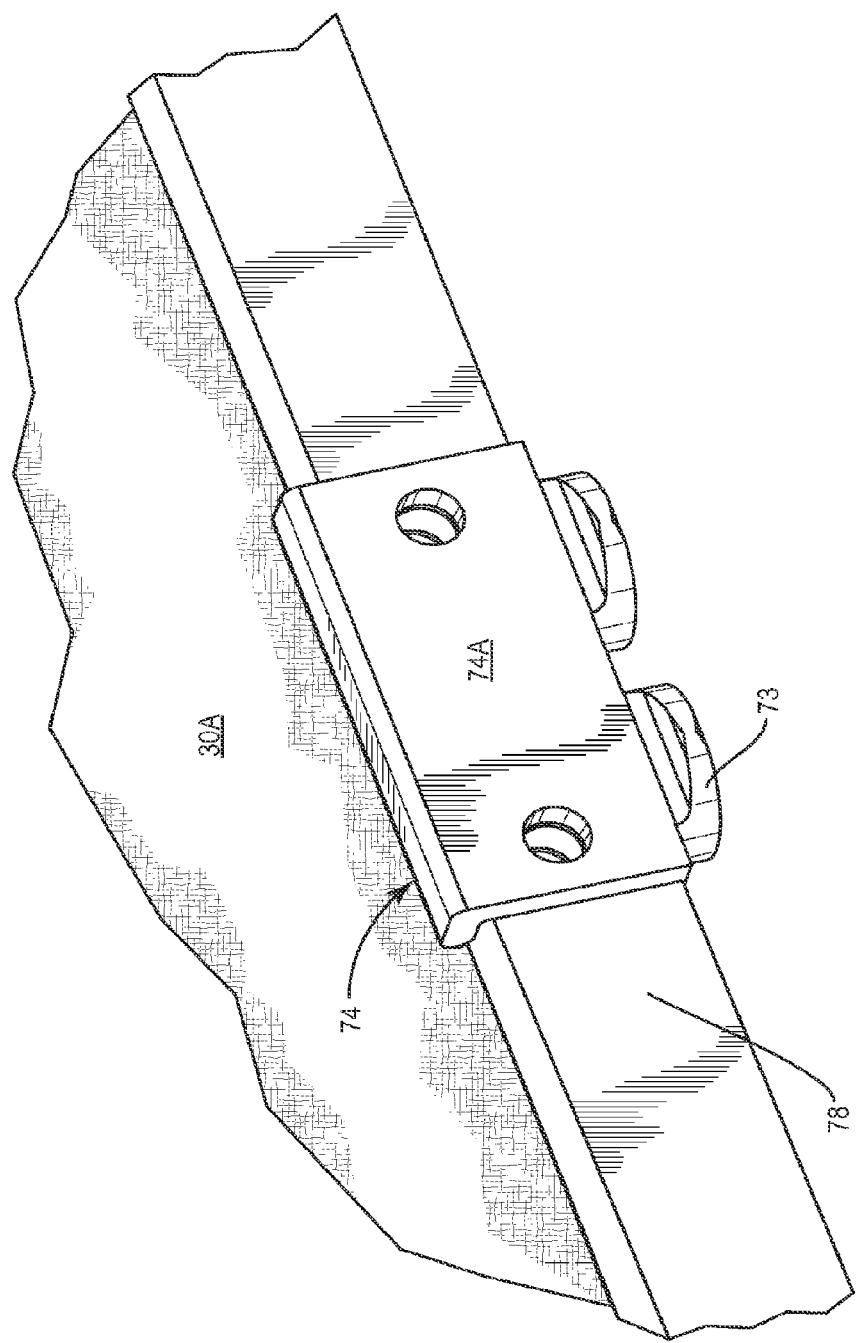
FIG. 6 is a partial perspective view of the lower edge of a closure member.
Figure 7:
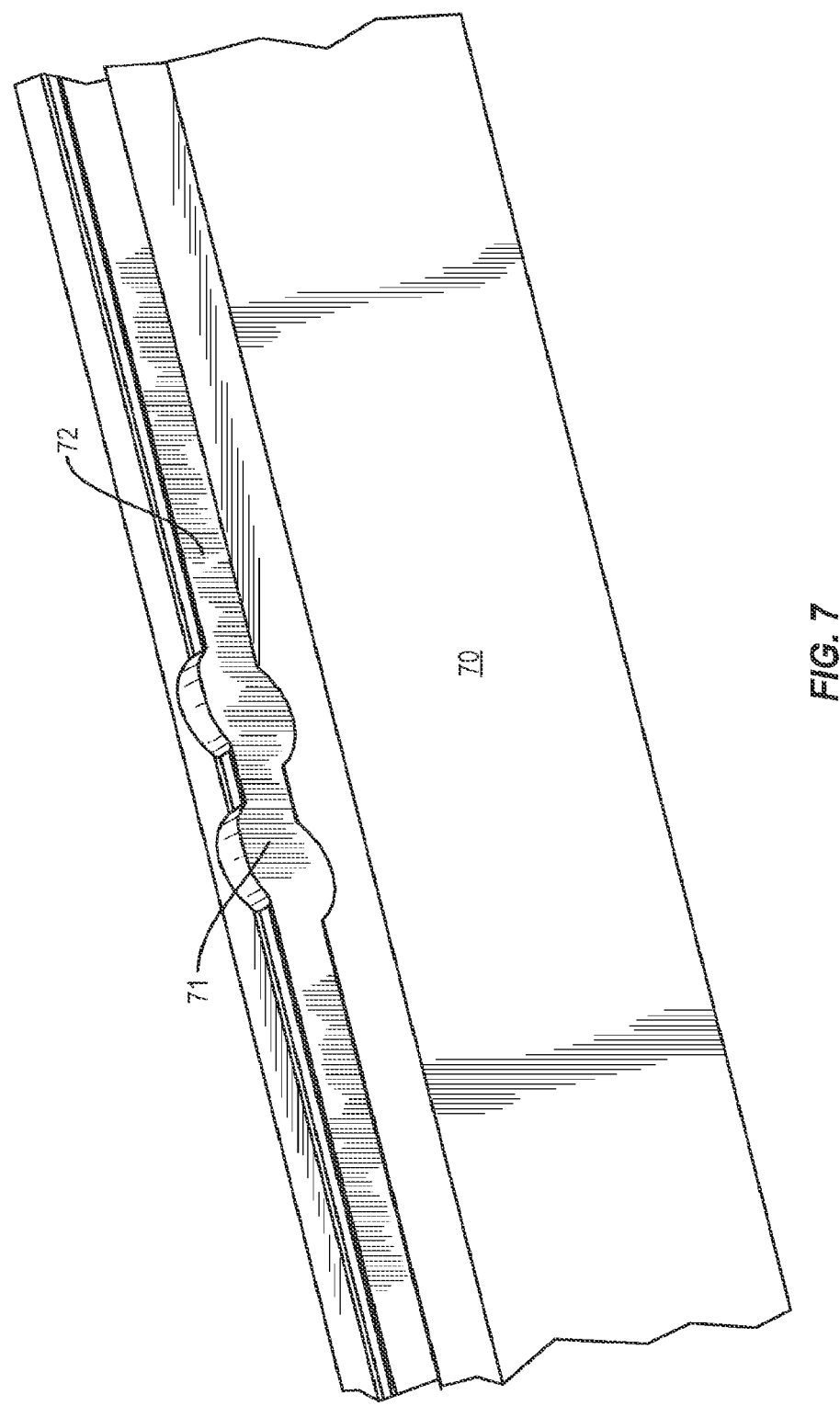
FIG. 7 is a partial perspective view of the rail which receives the lower edge of the closure member.
Figure 8:
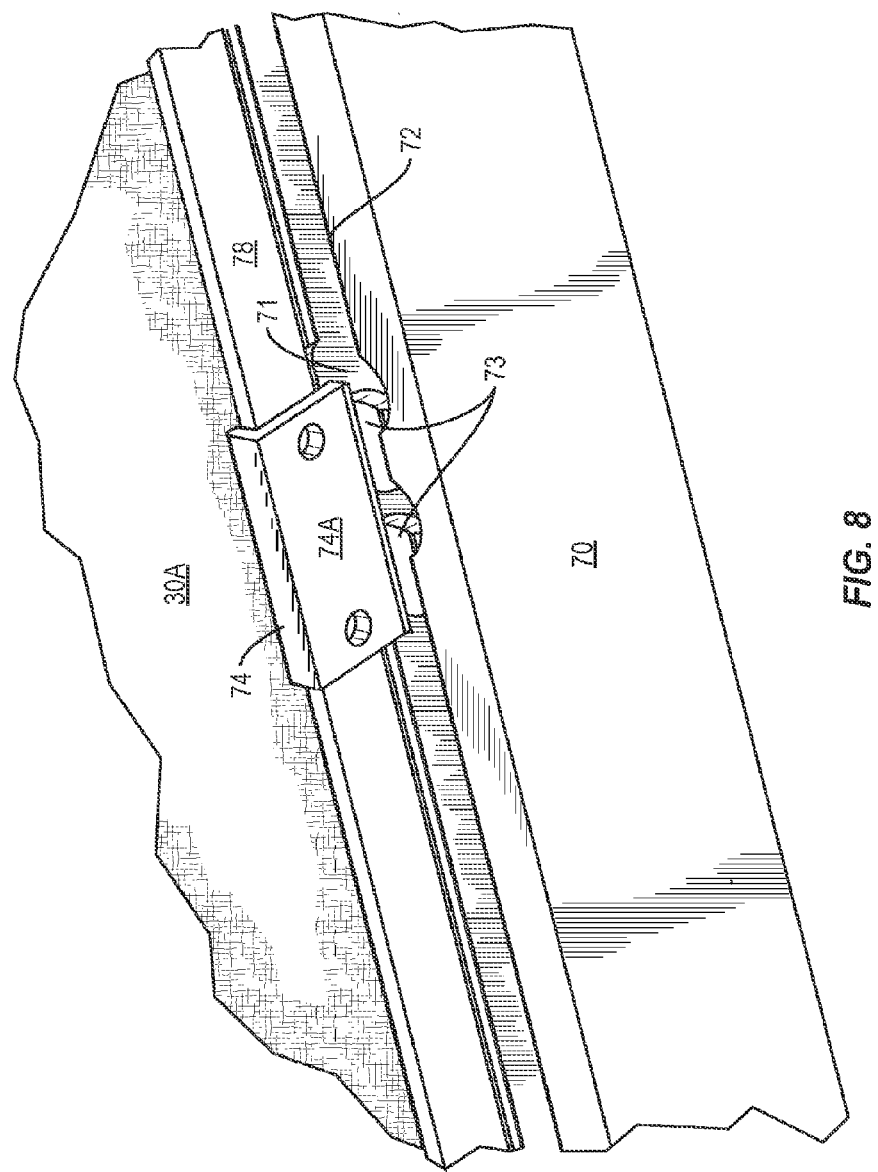
FIG. 8 is a partial perspective view of the closure member received in the rail of the frame.

As illustrated in FIGS. 6 through 8 cargo containers of this type often include a front rail 70 with a T-slot 72 therein. The bottom edge 36 of closure member 30A may be provided with a plurality of cleats, clamps or clips 74 which may be riveted or lock-bolted through the closure member 30A adjacent the bottom edge 36 thereof. For reinforcement the bottom edge may also be formed by a hem 78 through which a thin strip (¾"×³⁄₁₆" for example) of fiberglass, aluminum, or other light weight metal extends. The strip distributes the load between the cleats. The cleats 74 are formed of some appropriate strong hard polymeric or metallic material and include a base portion 74A and a locking portion in the form of a pair of circular members 73 extending downwardly therefrom. The locking portion (circular members 73) is secured to the base portion 74A.

Two or more sets of two bores 71 are provided through the top wall forming the T-slot 72 which receives circular members 73 of cleats 74, which are so sized and shaped as to ride easily in T-slot 72. Once in the track, movement of the cleats 74 along the track in such a manner that the circular members 73 are no longer aligned with the bores 71 will retain the bottom edge of the closure member 30A in place.

The door or closure member may also be metal, a composite construction similar to side walls 24, 26, 28, 30, 32, or any other construction that will contain fires with temperatures of up to 1500° F. for 4 hours.

Figure 3:
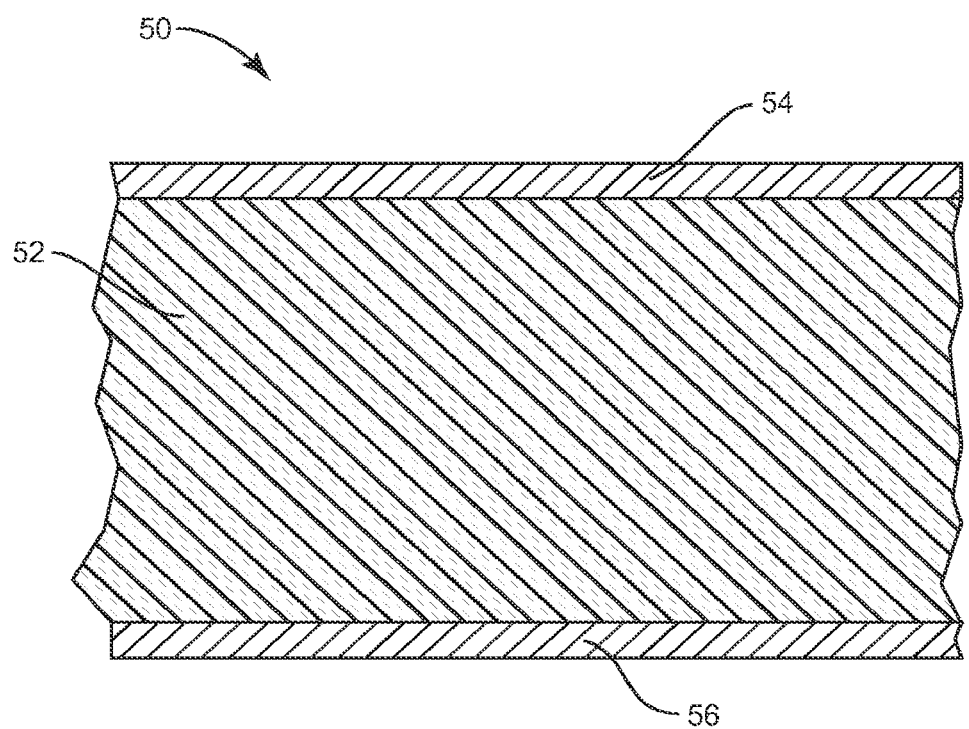
FIG. 3 is a cross-sectional view of a first embodiment of a composite panel that could be used for the side, rear, roof, and/or front door panels.

Referring now to FIG. 3, a first aspect of a composite panel assembly is illustrated at 50. The illustrated composite panel 50 may be used as any one of the panel assemblies 20, 22, 24, 26, 28, and 30 illustrated in FIG. 1. It can even be used as the door closure panel.

The illustrated composite panel 50 of FIG. 2 includes a core 52 and a skin 54, 56 attached in some appropriate manner to either surface thereof.

The Foam Core

The core structure should be made from a fire resistant foam having a density between 0.75 lbs/ft³ (pcf) to 20 pcf, however, a density of between 1.9 pcf and 7.4 pcf is preferred. Densities over 20 pcf would work well as a structural core and as an insulation material, but weight of the final product then becomes more of a question and perhaps prohibitive. The typical foam used in composite construction is a closed-cell foam. Since liquid resin is often used in the construction and/or bonding materials, it is important that the foam be unable to "soak up" the resin. The closed-cell foam provides enough surface "roughness" for excellent bonding without allowing resin to impregnate the core.

Figure 4:
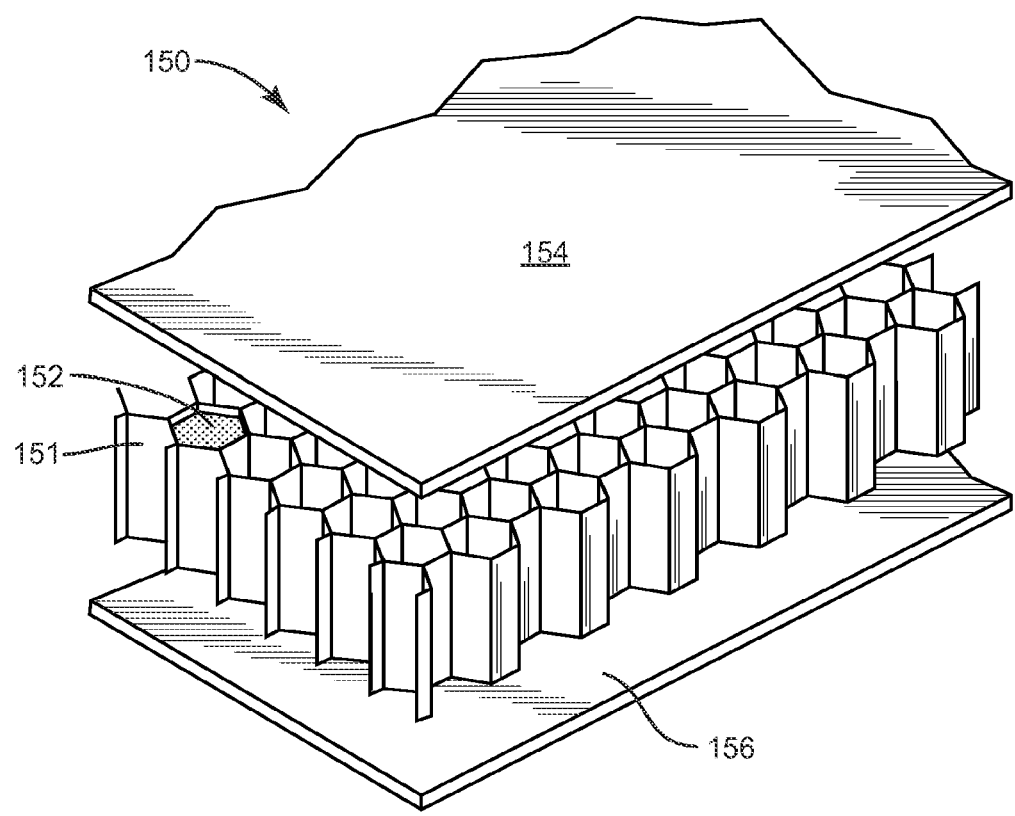
FIG. 4 is an exploded, partial perspective view of an alternative approach to the composite panel of FIG. 2.

Another acceptable core structure 150 is the use of a foam-filled honeycomb (See FIG. 4). This provides the high compressive and shear strength characteristics of a honeycomb with the insulation properties and bonding surface area of closed-cell foam. This construction tends to be of a higher density than foams alone. A typical construction for this application might be a phenolic paper/cloth honeycomb 151 with cells filled with phenolic foam 152 and two skins 154, 156.

The foam also serves to "contain" resin flow when a through fiber is used in an embodiment to be described later in this application. In this situation, resin used to impregnate the composite skins can migrate into the through fiber without soaking into the foam there around.

The key properties necessary in the foam for use in fire containment containers of the present invention are that the foam itself does not melt, support flame, or completely degrade in the presence of temperatures below 1500° F. A partial list of materials that meet this requirement include:

A. Phenolic foam, which is an organic foam that starts to "char" at temperatures over 800° F. It does not burn, melt, or degrade, but instead maintains some of its structural integrity and much of its thermal insulative properties even when charred. Thus, this type of foam is satisfactory for many applications.

B. Carbon foam can withstand extremely high temperatures (greater than 3000° F.) without significant degradation. Carbon foams make an excellent fire barrier, but usually are available in higher densities (greater than 10 pcf) and at costs that are significantly higher than phenolic foams. For these reasons, while carbon foam may be less desirable, however it is still a possibility.

C. Ceramic foams are similar to carbon foams in properties. They also tend to have higher densities and costs than phenolic foams.

Other foams such as mineral-based "pumice" represent possible solutions, along with such polymeric foams as polyimides, polysulfides and polyketones, but are not commercially viable at the present time.

Any thickness of foam or foam/honeycomb can be used as a core material in composite construction. It is common composite design practice to use a structural core, such as foam, to separate fiber-reinforced skins. This provides a much higher stiffness to weight ratio compared to a solid composite alone. For the present application, the foam serves the multiple purposes of structural core, thermal insulator, and fire barrier. Each application will have an "optimum" construction which is dependent on strength, stiffness, weight and fire containment properties. For practical purposes, one can say that a core thickness of 0.1 inch probably represents the minimum thickness that can possibly achieve the properties listed above. Since foam is the lightest of the components, it is advisable to increase the thickness up to the level where skin buckling can occur. There is really no maximum thickness of foam, however space, weight and cost considerations would be limiting factors in this regard. In the present application, it is anticipated that foam thickness will preferably fall between the values of 0.25 inches-2.0 inches for the majority of containers. However, slightly greater thicknesses of 3-5 inches are also possible.

Composite Skin Characteristics

The skins 54, 56 will be formed of a fiber and matrix resin which binds the fibers together. The key property necessary in the fire resistant fibers for use in fire containment containers is that they do not melt, support flame or completely degrade in the presence of temperatures up to 1500° F. Such materials that meet this requirement include:

A. Fiberglass, which reportedly starts melting at approximately 1200-1400° F. Testing has even shown that in the presence of 1500° F. flame, fiberglass cloth and mat has retained sufficient integrity to serve as a flame barrier. Fiber density in the case of fiberglass is approximately 2.61 gm/cm³.

B. Basalt/mineral fibers have similar structural properties to fiberglass, but have the added advantage of being more heat resistant. Typical melting/degradation of basalt fibers are in the range of 2400° F. Basalt fibers are approximately the same density as fiberglass, but are significantly more expensive. Because of this they represent a cost/performance choice only at temperatures where fiberglass begins to fail. Fiber density of basalt fibers is expected to be approximately 2.78 gm/cm$^3$.

C. Aramid cloth, mat and non-wovens (known as Nomex, Kevlar, Technora and others) act somewhat like phenolic. They do not burn, but can char. These materials do not burn, but instead can maintain some of its structural integrity and nearly all of its thermal insulative properties even when charred. The additional toughness of these fibers make them more cost-effective as an outer skin or mixed with the other fibers in a hybrid construction. Fiber density is approximately 1.44 gm/cm$^3$. Cost is relatively high.

D. Carbon fibers can withstand extremely high temperatures (greater than 300° F.) without significant degradation. They are also extremely stiff structurally with fiber moduli ranging from 25 Msi to over 100 Msi. Carbon fiber composites tend to be much more brittle than those made from glass, basalt, or aramid fibers. The density of carbon fiber is approximately 1.78 gm/cm$^3$ which falls between fiberglass/basalt and aramid. Carbon fiber can be a good choice if weight is of primary importance—costs and toughness are sacrificed.

E. Ceramic or quartz fibers offer extremely high thermal resistance and do not burn under any normal conditions. Like carbon, however, they tend to be brittle and expensive.

As in all composite materials, the fibers listed above can be used in various constructions. The choice of construction is based on required structural properties, toughness and cost. The type of fibers can be mixed or blended in all construction types to provide hybrid properties.

By way of example, fibers can be laid up in a unidirectional pattern in which the fibers in a given layer are straight and lined up. Bulk properties are then generated by the number of layers and the fiber angle of each layer compared to the other layers. Stiffness and strength is optimized, but toughness is often sacrificed.

Fiber may also be woven into one of many constructions common to the weaving industry. Fiber angle can also be varied either by the weaving process or by the lay-up process. Toughness is optimized at the expense of stiffness and strength in this approach. There is also the possibility of what can be referred to as "3D-woven," which is similar to woven except that fibers are placed in the Z axis to provide resistance to delamination between layers or plies. This is generally an expensive approach.

In another non-woven approach, fiber is placed in a more random orientation. In this approach, typically shorter fibers are used, and a number of constructions are possible such as continuous strand mat, chopped strand mat, needle punch, and felt.

The thickness of the skin or laminate can be discretely changed by varying the number of layers, or by the thickness of each individual layer, or by a combination of both. All layers can be of the same fiber material or can be of different fiber blends. The resin used (discussed below) is generally the same in all layers, but not necessarily so as they could be different.

To complete the construction of the skin, a matrix resin is used to bind the fibers together so that the fiber creates a uniform construction which is highly dependent on fiber properties. Without the matrix, the fibers would be "cloth-like" and have no structural properties. In order for the container to function as a structural device, a proper combination of fiber, construction, and matrix is necessary. As a thermal barrier, however, this construction could be severely compromised and still function. The key properties necessary in the resin for use in fire containment containers would be that the resin itself does not melt, support flame or completely degrade in the presence of temperatures up to 1500° F. Partial degradation in the presence of these temperatures is generally acceptable as long as the fiber stays together and the total construction acts as a thermal barrier. A partial list of resin materials that meet this requirement is listed below:

A. Thermosetting resins which are cross-linked during polymerization and do not generally "melt." Although no organic polymer can withstand temperatures of 1500° F., many char or carborize and continue to function as a binder, although in a weakened state. In this form, the construction can still form as a thermal barrier. These resins would include phenolic, polyimides including bismaleamides, epoxies, polyesters, and vinyl esters.

B. Thermoplastic polymers can be melted and reformed with temperature. In general, this property would in itself make the materials unacceptable as a thermal barrier. However, some of the materials do not melt into a liquid but stay in place and carborize in the presence of flame and act similar to a charred thermoset. These would include polyphenylene sulfide and similar sulfides, polyether imide, polyamide imide, and polyetheretherketone.

Composite Construction

The skins and core can be secured or attached in various ways. For example, in a mechanical approach, a typical construction which would provide a high strength to weight material would be two layers of fiber composite with a core in between. The layers would be adhered to the core in some manner, probably by the matrix resin. The optimal thermal "survival" construction is similar to the mechanical construction, in which case the core can act as a thermal barrier to protect the "non fire" side of the composite. In this approach, even though the fire side composite skin may partially or completely degrade, the insulation properties of the core layer will protect the outside composite skin. This allows the structure to maintain enough properties to hold shape and contain the fire for the necessary four hours.

Figure 5:
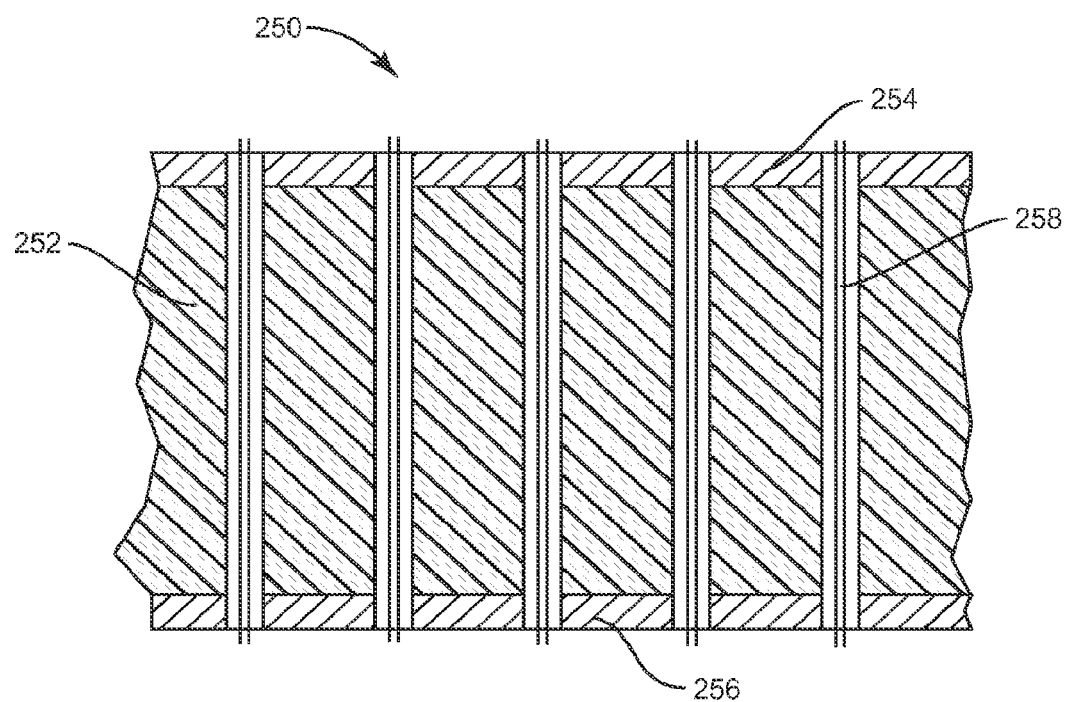
FIG. 5 is a sectional view of a second alternative approach to the composite panel of FIG. 2.

A relatively different approach to a panel 250 is illustrated in FIG. 5, in which Z-axis fibers 258 are inserted through the skins 254, 256 and core 252. This approach of a reinforced composite is the development of Ebert Composites Corporation of Chula Vista, Calif., and is illustrated in U.S. Pat. Nos. 6,676,785; 6,645,333; 7,105,071; 7,217,453; 7,387,147; 7,846,528; 7,785,693; and 8,002,919, which patents are incorporated by reference. In this approach, there is provided a process to place Z-axis structural fibers through the skins and core. These fibers are impregnated with resin during the manufacturing process. They actually become "columns" that increase compression and shear strength. More importantly, because they go completely through the structure they serve to prevent delamination, which is a typical failure mode in composites with a core. Typically, the core fails in a delamination causing large reduction in properties or complete failure. With Z-axis fibers, which are actually rigid fibers, the fibers go through the skins and core, and delamination is not possible without breaking these fibers. They also reinforce the foam thermal barrier and have a small cross-section which minimizes heat transfer between fire-side and outside skins. With this type of structure, particularly if reinforced by adding high shears, Z-Y partitions in the foam core as described in Ebert's U.S. Pat. No. 7,785,693, a composite panel is possible that would serve as a floor of the container.

The fibers in and of themselves do not provide any thermal advantages. Instead, they hold the structure together in the event of thermal degradation of the fire-side skin. By holding this fiber in place, the fire-side skin continues to act as a thermal barrier even in the absence of any structural properties. The Z-axis fibers also tend to spread load from a high thermally damaged area to areas that retain their structure. Preferably, these fibers would be carbon fibers, basalt fibers, or glass fibers which would be punched through the dry fabric and cut, allowing a length of fiber to protrude beyond both sides of the skins. The density of the Z-axis fibers (fibers/inches squared) and location of fibers can be varied to optimize the physical properties of the panel. When the panel is coated with resin, as described hereinabove, the protruding fibers are impregnated along their entire length and folded over to the outside surfaces of the panel. Then when the panel is cured, these fibers act as "staples" to hold the structure together and prevent delamination. Each fiber represents a column with high compressive strength and high resistance to delamination.

The processes listed above assume that the construction "preform" is put together in dry form then coated/impregnated with resin and cured using pultrusion or other composite forming/during methods. While this may be the most economical process in large volumes, another alternative is the use of pre-impregnated fiber reinforcements (pre-pregs). Pre-pregs are commonly used in composite construction because they allow fiber to be coated under very carefully controlled conditions and then cured to a "B-stage" or partially cured condition. When heated, the resin flows before it cures (in the case of a thermoset resin) or freezes (in the case of a thermoplastic resin). The Z-axis fibers can be coated in a similar fashion. In addition to better control over the coating process, the pre-preg process allows that handling of potentially hazardous materials (such as phenolic resin) in a carefully controlled environment can occur. The final product result is essentially the same regardless of the method used to coat the fiber. Another way of providing Z-Axis strength is a process used by Acrosoma NV of Lockeram, Belgium (www.acrosoma.com) which uses a carpet stitching process to sew the laminate structure together. This process is generally limited to the use of non-brittle fiber such as Kevlar or Technora, but may be adapted to other more brittle fibers such as carbon, basalt or glass. This type of construction generally provides lower compressive and shear strengths, but serves to prevent the composite panel from delaminating as long as the fiber stays intact.

In one preferred embodiment, there has been provided a composite structure consisting of fiberglass/polypropylene composite skins (0.020 inches thick) and a polypropylene honeycomb core (0.5 inches thick) has properties that not only work with the application, but are superior to other materials of the construction currently used. The structure proposed for the fire containment air cargo container is superior to that currently used in all areas except cost. Based on this, however, it is believed that structurally, the new construction will meet all the structural and fire-containment needs of the customer base.

Figure 9:
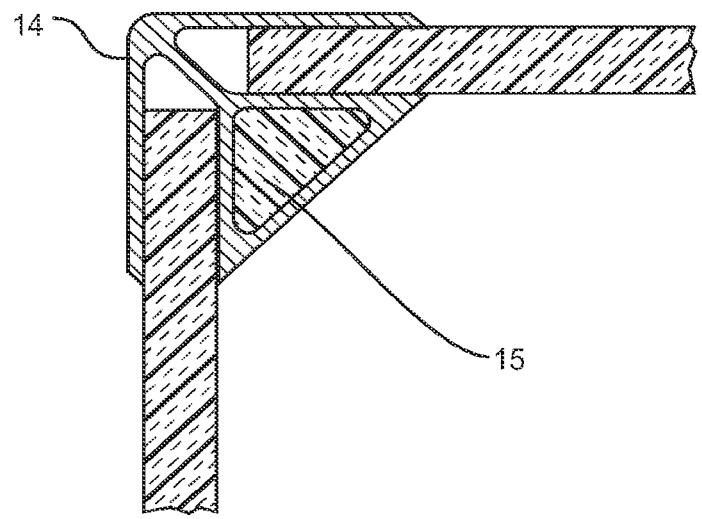
FIG. 9 is a cross-sectional view of frame member 14.
Figure 10:
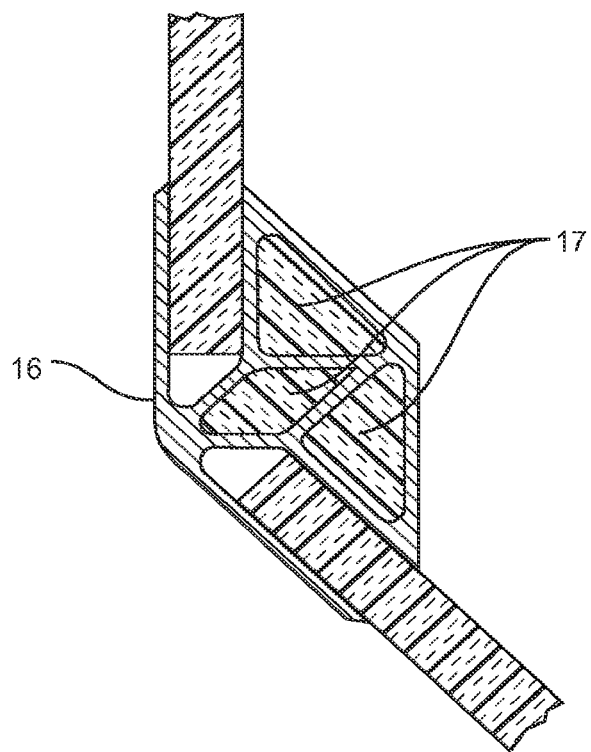
FIG. 10 is a cross-sectional view of frame member 16.

Preferably the frame members 14 and 16 should also be so constructed as to limit or prevent a pathway for the fire from the interior to the exterior. For this purpose, as illustrated in FIGS. 9 and 10, frame member 14 includes a foam core 15, and frame member 16 includes a foam core 17. The foam cores 15 and 17 are so placed in cooperation with the panel cores 52, 150, and 152 as to block any direct path for the fire through the frame member to the outside, and also may be phenolic, carbon, ceramic, or other foams such as mineral-based "pumice," along with such polymeric foams as polyimides, polysulfides, and polyketones.

Testing

A small scale test was run in which a piece of composite material consisting of a phenolic foam core with two phenolic/fiberglass composite skins and Z-axis fibers at a fiber density of four fibers per square inch was subjected to a 1500° F. flame for four hours. Thermocouples read the temperature at the flame-side surface and also at the opposite surface. Even though the flame-side temperature remained at 1500° F., the opposite face was insulated from the heat by the phenolic foam core and did not exceed 500° F. The flame-side face evidenced complete burnout of the phenolic resin matrix, but did not fall apart or delaminate. Because the opposite face did not reach 800° F., the degradation temperature of phenolic, it remained intact and was only discolored. Structurally, the entire panel was held together and would support itself in an air cargo container. This was a very preliminary test, but the results clearly show that the composite construction consisting of phenolic skins, phenolic foam core and Z-axis fibers will withstand the thermal assault of this test.

As will be apparent to those skilled in the art in the light of the foregoing disclosure, many alterations and modifications are possible in the practice of this invention without departing from the spirit or scope thereof. Accordingly, the scope of this invention is to be construed in accordance with the substance defined by the following claims.

What is claimed is:

1. Composite panel for containers providing resistance to fire emanating from within the interior of the container and comprising:
   a foam core made from a fire-resistant, closed cell foam and having a density of between 0.75 lbs/ft$^3$ and 20.0 lbs/ft$^3$ and a substantially uniform thickness of at least 0.1 inch; and
   a skin attached to each surface of the core, at least one of the skins is a fire resistant skin formed by fire resistant fibers having a melt temperature of least 1200° F. with fire resistant a matrix resin spread throughout the fibers, the resin composition being such that it does not melt, support flame, or completely degrade in the presence of temperatures up to 1500° F.;
   wherein the composite panel is of such construction as to be able to block an internal fire with temperatures of up to 1500° F. for a period of at least four hours.

2. The composite panel according to claim 1 wherein the core is formed of foams selected from the group consisting of phenolic, carbon, ceramic, polyimides, polysulfides, polyketones, and mineral based pumice.

3. The composite panel according to claim 1 wherein the foam core density is between 1.9 lbs/ft$^3$ and 7.4 lbs/ft$^3$.

4. The composite panel according to claim 1 wherein the foam core has a substantially uniform thickness between 0.25 inch-2.0 inch.

5. The composite panel according to claim 1 wherein the fire resistant skin is formed from fibers selected from the group consisting of fiberglass, basalt, aramid, carbon, ceramic, quartz and blends thereof.

6. The composite panel according to claim 1 wherein the matrix resin is selected from the group consisting of phenolic, polyimide, epoxy, polyester, vinyl ester, polyphenylene sulfide, polyether imide, polyamide imide, and polyetheretherketone.

7. The composite panel according to claim 1 wherein Z-axis fibers extend through the skins and core which become reinforcing columns when impregnated with resin that increase compression and shear strength and prevent delamination.

8. Air cargo container providing resistance to fires emanating from the interior comprising:
- a plurality of side walls, a rear wall, and a roof connected together so as to form an enclosure, each of the walls and the roof formed of at least one composite panel, each composite panel further comprising:
  - a foam core made from a fire-resistant, closed cell foam and having a density of between 0.75 lbs/ft$^3$ and 20.0 lbs/ft$^3$ and a substantially uniform thickness of at least 0.1 inch; and
  - a skin attached to each surface of the core, at least one of the skins in a fire resistant skin formed by fire-resistant fibers having a melt temperature of at least 1200° F. with a fire resistant matrix resin spread throughout the fibers, the resin composition being such that it does not melt, support flame, or completely degrade in the presence of temperatures up to 1500 ° F.;
- wherein the composite panels are of such construction as to be able to contain an internal fire with temperatures of up to 1500 ° F. for a period of at least four hours.

9. The air cargo container according to claim 8 wherein the foam core is formed of foams selected from the group consisting of phenolic, carbon, ceramic, polyimides, polysulfides, polyketones, and mineral based pumice.

10. The air cargo container according to claim 8 wherein the foam core density is between 1.9 lbs/ft$^3$ and 7.4 lbs/ft$^3$.

11. The air cargo container according to claim 8 wherein the foam core has a substantially uniform thickness between 0.25 inch-2.0 inches.

12. The air cargo container according to claim 8 wherein the fire-resistant skin is formed from fibers selected from the group consisting of fiberglass, basalt, aramid, carbon, ceramic, quartz and blends thereof.

13. The air cargo container according to claim 8 wherein the matrix resin is selected from the group consisting of phenolic, polyimide, epoxy, polyester, vinyl ester, polyphenylene sulfide, polyether imide, polyamide imide, and polyetheretherketone.

14. The air cargo container according to claim 8 further comprising a doorway selectively covered by a door construction selected from the group consisting of: one or more of the composite panels, and a fabric comprising basalt, carbon, or glass fibers.

15. The air cargo container according to claim 8 further comprising a framework including vertical and horizontal frame members so constructed as to define openings for the plurality of walls of the container.

16. The air cargo container according to claim 15 wherein the frame members are made from materials selected from the group consisting of temperature resistant plastics and temperature resistant composites.

17. The air cargo container according to claim 15 wherein at least some of the vertical and horizontal frame members include a fire resistant foam core which blocks a direct path through the frame member for the internal fire to the outside.

18. The air cargo container according to claim 17 wherein at least some of the vertical and horizontal frame members include two slots to support adjacent walls, and at least one channel between and separate from the slots, for housing the fire resistant core of the respective frame member.

19. The air cargo container according to claim 8 wherein Z axis fibers extend through the skins and core which become reinforcing columns when impregnated with resin that increase compression and shear strength and prevent delamination.

* * * * *